Oct. 9, 1934.   W. RICHTER   1,976,298
TEMPERATURE CONTROL
Filed Sept. 23, 1933

INVENTOR.
Walther Richter
BY [signature]
ATTORNEY.

Patented Oct. 9, 1934

1,976,298

UNITED STATES PATENT OFFICE 1,976,298

TEMPERATURE CONTROL

Walther Richter, Wauwatosa, Wis., assignor to A. O. Smith Corporation, Milwaukee, Wis., a corporation of New York Application September 23, 1933, Serial No. 690,756

5 Claims. (Cl. 236—46)

The present invention relates to apparatus for use in the control of the temperature of furnaces and the like and more particularly for use in predetermining the definite cycle of temperature which the furnace or other unit shall have imposed upon it during a period of its operation.

An object of the invention is to provide an accurately operative device by which the temperature of a heat utilizing equipment may be caused to follow a previously determined set of values during the periods of time constituting a cycle of operation of the equipment.

Another object is to provide a temperature control arrangement in which any new predetermined time cycle of temperature in the utilization equipment may be provided with a minimum expenditure of time and expense.

Figure 1:
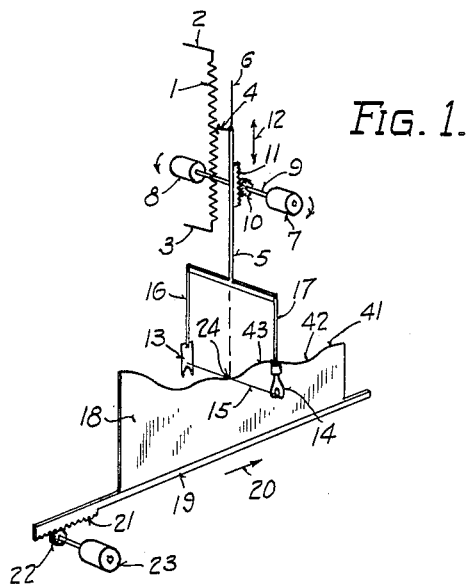
Figure 2:
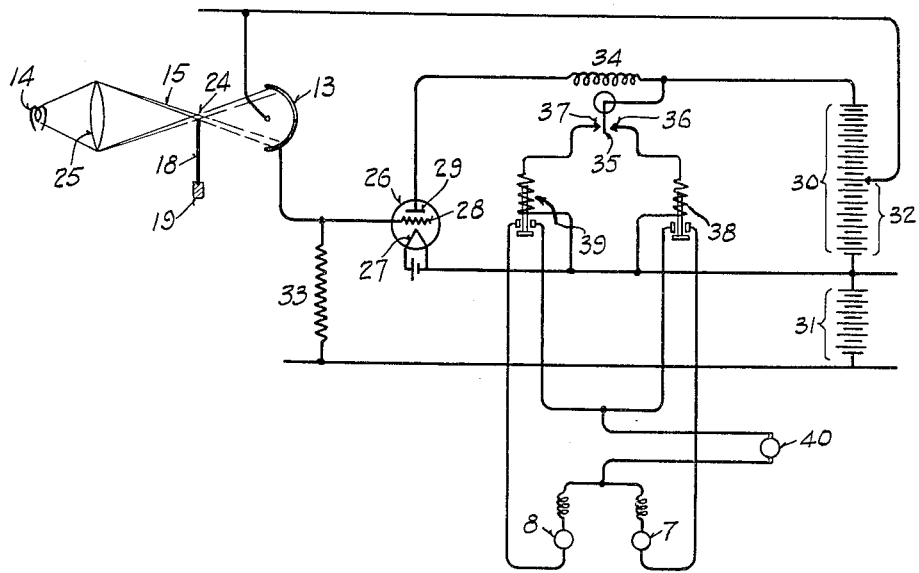

Other objects will be apparent from the following description and claims. The invention will be best understood by referring to the accompanying drawing, in which:

Fig. 1 is a diagrammatic sketch illustrating simply the functional arrangement of certain mechanical and electrical parts employed in the preferred form of the invention; and Fig. 2 is diagram of the preferred electrical arrangement as employed with the parts shown in Fig. 1.

The temperature adjustment of the furnace is obtained by means of a pyrometer controller (not shown) in which the potentiometer resistance 1, Fig. 1, is employed to obtain the adjustment necessary to establish each given temperature in the furnace. Potentiometer resistance 1 is connected to the pyrometer controller circuits by means of leads 2 and 3. The pyrometer controller adjustment is obtained through rider contact 4 which is attached to, but preferably insulated from, traverse bar 5 and is connected to the pyrometer controller circuits by means of lead 6. The bar 5 is caused to move in upward and downward direction by means of motors 7 and 8, respectively, which are here shown mounted on the common shaft 9 which also carries pinion 10. Pinion 10 engages rack 11 attached to bar 5.

The pinion 10 and rack 11 are only illustrative. Any properly selected drive between shaft 9 and bar 5 is satisfactory. It is preferable to employ two alternating current motors 7 and 8 mounted on shaft 9 as shown, motor 7 being arranged to turn shaft 9 in one direction and motor 8 being arranged to turn it in the opposite direction. The bar 5 has imparted to it movements indicated by arrows 12. It is, however, satisfactory to employ one motor arranged to turn shaft 9 first in one direction and then in the opposite direction. In this last arrangement it is preferred to employ a direct current motor.

Motors 7 and 8 are caused to rotate by means of a control exerted by the photo-electric cell 13. As will be explained hereinafter, the increase of light on photo-electric cell 13 causes an increase in the current flowing through it, and a decrease in the light which this cell receives causes a decrease in its transmitted current. The cell is so arranged that in one case motor 7 and in another case motor 8 is made to rotate and impart motion to shaft 9 as the light falling on the cell is lesser or greater respectively than a given amount. This light is supplied to cell 13 by lamp 14 through light beam 15. The cell 13 and lamp 14 are attached to bar 5 by means of arms 16 and 17, respectively, and move with bar 5. Thus light beam 15 has imparted to it the same rectilinear motion as has bar 5.

The card 18 is a temperature control schedule card mounted upon support 19 which is caused to move during a given time cycle of temperature control in the direction of arrow 20. This movement of bar 19 is imparted through rack 21 and pinion 22 by means of motor 23 which is a constant speed electric motor preferably of the alternating current type.

While, for simplicity, control card 18 is shown as a plain sheet of paper mounted upon a straight bar 19, this part of the apparatus has been constructed with card 18 made of opaque paper and wrapped around a glass cylinder. This is the preferred method of supporting said card. The glass cylinder is then given a uniform circumferential motion through gears corresponding to rack 21 and pinion 22 by means of motor 23.

The control card 18 is cut in such a manner that each point on its upper or control edge represents a predetermined time division at which a specific temperature is to be maintained when measured parallel to the direction of motion of the uniformly moving support 19, and represents said temperature when measured in the direction of movement of bar 5. The time divisions are determined by the selected rate at which bar 19 is caused to move and the temperature measurements are determined by the temperature adjustment positions predeterminably ascertained along potentiometer resistance 1.

The photo-electric cell 13 is employed to automatically cause the beam of light 15 to accurately follow the upper or control edge of control card 18 as this card is advanced through the time period of control and the desired temperatures in the furnace or other heat utilization equipment are thereby obtained by means of the successive automatic adjustments of contact 4 on potentiometer 1.

The means by which light beam 15 is caused to follow the control edge of card 18 are illustrated in their preferred form in Fig. 2. The lamp 14 has its beam of light 15 concentrated in a narrow beam at point 24 in the position of the control edge of card 18 by lens 25. By accurately concentrating the light beam in this manner, a small movement of the card greatly effects the quantity of the light falling upon the photo-electric cell and the device is thereby made very sensitive. The temperature adjustment is thus made very accurate and at the precise time desired.

The electronic vacuum tube 26 having filament 27, grid 28, and plate 29 is employed in conjunction with photo-electric cell 13 for controlling the operation of motors 7 and 8. The B-battery 30 is provided to supply voltage to the plate circuit of tube 26. The C-battery 31 is provided to supply a bias voltage to grid 28. Section 32 of B-battery 30 plus C-battery 31 are arranged to supply voltage to photo-electric cell 13 through resistance 33. The resistance 33 carries the current which passes through cell 13. The flow of this current produces a resistance drop in 33 and causes the bias or negative voltage imposed upon grid 28 to be less than that of C-battery 31 by the amount of such voltage drop. Thus as more light is thrown on photo-electric cell 13, more current passes through resistance 33 whose voltage drop is then increased and thereby the bias voltage imposed on grid 28 is decreased. This decrease in the grid bias voltage causes an increase of the plate circuit current which flows through tube 26 due to the application of the voltage of battery 30 between filament 27 and plate 29.

The coil of balanced relay 34 is inserted in the plate circuit. The relay 34 is so adjusted that it maintains its contact arm 35 in a central neutral position when the current caused to flow through the plate circuit is of a given selected value. This selected value is that amount of plate current which flows when a given amount of the light from beam 15 passes control card 18 and falls upon photo-electric cell 13. A decrease or increase of the current in the coil of relay 34 from this balancing value causes arm 35 to be moved into contact with contact points 36 and 37, respectively.

The normally open contactors 38 and 39 are employed to control motors 7 and 8, respectively. The operating coils of these contactors are arranged to receive current from battery 30 through relay arm 35. The motors 7 and 8 are arranged to receive their operating current from alternating current source 40 through the contacts of contactors 38 and 39, respectively.

The operation of the apparatus is as follows: A control card 18 is constructed with its control edge of the proper shape to provide for a successive set of temperature adjustments in the furnace through a known period of time which constitutes the cycle of operation of the furnace. This card is placed on support bar 19. The initial temperature value point 41 of the card is placed at the horizontal position of the light beam 15. In this position the light beam 15 is caused to automatically move vertically to the position of the control edge as will be clear from the following description. At the beginning of the cycle, constant speed motor 23 is started and is preferably kept running until the completion of the cycle. The card 18 and its support 19 are moved in the direction of arrow 20. Following the movement of card 18 as illustrated, the initial temperature value point 41 is moved away from the light beam 15 as its support 19 is advanced and the lower point 42 is moved toward this light beam, exposing the photo-electric cell to more light. The added light causes more current to flow through the cell 13 and resistance 33 from batteries 32 and 31. As previously explained, this results in an increase of the voltage drop in resistance 33, a lowering of the bias voltage on grid 28, and an increase of the current in the plate circuit and the operating coil of balanced relay 34. The current increase through the coil of relay 34 causes arm 35 to contact point 37. Battery 30 now causes current to flow in the coil of contactor 39, the contacts of which are thereby closed. The current source 40 then causes current to flow through motor 8 which then rotates to lower bar 5 and light beam 15. This motion continues until card 18 at point 42 cuts off enough light from cell 13 to result in a lowering of the current in relay 34 to the value at which arm 35 assumes its neutral position. Thereupon the coil circuit of contactor 39 is opened and its contacts open, thus stopping motor 8. The light beam 15 is now vertically positioned at the point 42 and contact rider 4 is at a vertical position corresponding to that of the control card 18 at point 42. A corresponding adjustment of the temperature of the furnace is effected through this adjustment of the position of rider 4 on potentiometer 1.

The control card continues to advance until a higher point such as 43 is reached. In this position card 18 causes less light to fall upon the cell 13. The several steps are then reversed resulting in a smaller current flowing through relay 34, closing contacts 35 and 36, closing contacts 38 and rotating motor 7, which raises the light beam until the needed amount of light falls upon cell 13 to result in the returning of arm 35 to its neutral position. At this point motor 7 is stopped and the temperature setting of the furnace is now made at the new higher value corresponding to point 43 on the control chart. In the above manner, light beam 15 is caused to follow the temperature representing points on the control edge of card 18 and it is advanced throughout the time cycle and corresponding adjustments of the furnace temperature are secured.

The above apparatus is economical to construct, simple in operation, and exceptionally sensitive and accurate in the control exercised by it.

This invention is particularly useful in the control of temperatures in accordance with a predetermined schedule. It also is applicable to other uses. This invention, for example, can be made to control the speed of a motor in a manufacturing operation by having contact 4 operate on a speed control device. In like manner it can be used to control the pressure in liquids or the humidity of given atmospheres.

I do not wish to limit myself to the precise form employed in the drawing and description since many variations can be made without departing from the spirit of the invention. For example, I have employed in place of the batteries shown an alternating current rectifier to supply the various direct current voltages utilized for the operation of the equipment.

I claim:

1. An apparatus for use in the temperature regulation of a heat utilization equipment for a given cycle of operation comprising a photo-electric cell, a light source arranged to throw a beam of light upon said cell, a light intercepting element arranged to be carried transversely to said light beam in timed motion which element has a contour so formed as to represent the different temperatures to be maintained during the cycle, an adjustable temperature control means, and means to automatically effect a second relative motion between said light beam and light intercepting means to cause said light beam to follow the temperature representing contour of the light intercepting means and to adjust the temperature control means in accordance with the represented values of said contour.

2. A temperature control adjusting apparatus for automatically adjusting the temperature of a heat utilization unit in accordance with predetermined values during a cycle of operation comprising means embodying a combination of light sensitive cell and light source projecting a beam of light upon said cell, a light intercepting means movable relative to said first means in timed relation to the cycle of operation and having a temperature representing element, means cooperating with said first named means to automatically effect the adjustment of the temperature in accordance with the temperature representing element of said second means by causing said light beam to follow the contour of said element during the timed relative movement of said first and second means.

3. An apparatus for use in effecting temperature readjustments during a timed cycle of operation comprising a photo-electric cell and light source, a graphic element constructed to represent the time elements of an operating cycle and the temperatures to be maintained at said times, means to produce two relative movements between said first means and the graphic element, one relative movement being in the direction of and timed in accordance with the said time representation, the second movement being an automatic one effected through cooperative action with said first named means and the graphic element to maintain said first named means and temperature representations of the graphic element in fixed relative position, and means responsive to said second movement to effect temperature adjustments for each instant of time of the time cycle in accordance with the time representations of said graphic element.

4. A process control adjusting apparatus for automatically adjusting a condition of an operating unit in accordance with predetermined values of said condition, during a cycle of operation comprising means embodying a light sensitive cell and light source projecting a beam of light upon said cell, a light intercepting means movable relative to said first means in timed relation to the cycle of operation and having an element representing the values of the condition to be adjusted, means cooperating with said first-named means to automatically effect the adjustment of said condition in accordance with the condition representing element of said second means by causing said light beam to follow the contour of said element during the timed relative movement of said first and second means.

5. In an apparatus for use in effecting adjustments in a condition of an operating unit a combination comprising means embodying a light sensitive cell and a light source, means embodying a graphic element arranged to traverse the position of a light beam extending between the light source and the cell of said first means in accordance with a predetermined time cycle and means cooperating with said first-named means to cause said light beam to automatically follow in relative position an adjustment representing contour of said graph and thereby consecutively effect adjustments of the operating unit throughout a predetermined time cycle.

WALTHER RICHTER.